(12) United States Patent
Sander

(10) Patent No.: US 7,974,731 B2
(45) Date of Patent: Jul. 5, 2011

(54) METHOD FOR AUTOMATED STACKING OF WOOD PRODUCTS

(75) Inventor: George H. Sander, Palmyra, VA (US)

(73) Assignee: Weyerhaeuser NR Company, Federal Way, WA (US)

( * ) Notice: Subject to any disclaimer, the term of this patent is extended or adjusted under 35 U.S.C. 154(b) by 0 days.

(21) Appl. No.: 12/855,590

(22) Filed: Aug. 12, 2010

(65) Prior Publication Data

US 2010/0305735 A1    Dec. 2, 2010

Related U.S. Application Data

(63) Continuation of application No. 11/859,986, filed on Sep. 24, 2007, now Pat. No. 7,801,637.

(51) Int. Cl.
*G06F 19/00* (2006.01)
*B23Q 16/00* (2006.01)
*B07C 5/14* (2006.01)

(52) U.S. Cl. ...... 700/167; 144/424; 144/4.2; 144/245.5; 198/367.1; 209/517; 209/518; 209/521

(58) Field of Classification Search ............. 144/424, 144/4.2, 245.5; 198/367.1; 700/167; 209/517, 209/518, 521
See application file for complete search history.

(56) References Cited

U.S. PATENT DOCUMENTS

| 3,912,254 A | 10/1975 | Woodruff | |
| 4,846,923 A * | 7/1989 | Lines | 156/353 |
| 6,892,614 B2 * | 5/2005 | Olsen | 83/27 |
| 7,801,637 B2 * | 9/2010 | Sander | 700/167 |
| 2008/0082204 A1 * | 4/2008 | Kellam et al. | 700/223 |

* cited by examiner

*Primary Examiner* — Ryan A Jarrett
(74) *Attorney, Agent, or Firm* — Rachael Vaughn

(57) ABSTRACT

The disclosure relates to a computer-implemented method for stacking wood products. In some embodiments, the disclosure the steps of designing at least two types of engineered wood products via a software application; producing the at least two types of engineered wood products based on the designs utilizing a saw in conjunction with the software application; designating, via the software application, at least two bins to hold the at least two different types of engineered wood products; selecting a first bin for depositing a first type of engineered wood product; selecting a second bin for depositing a second type of engineered wood product; automatically placing the first type of engineered wood product into the first bin; and automatically placing the second type of engineered wood product into the second bin. The at least two types of engineered wood products are at least two of: panels, I-joists, headers and dimensional lumber.

9 Claims, 5 Drawing Sheets

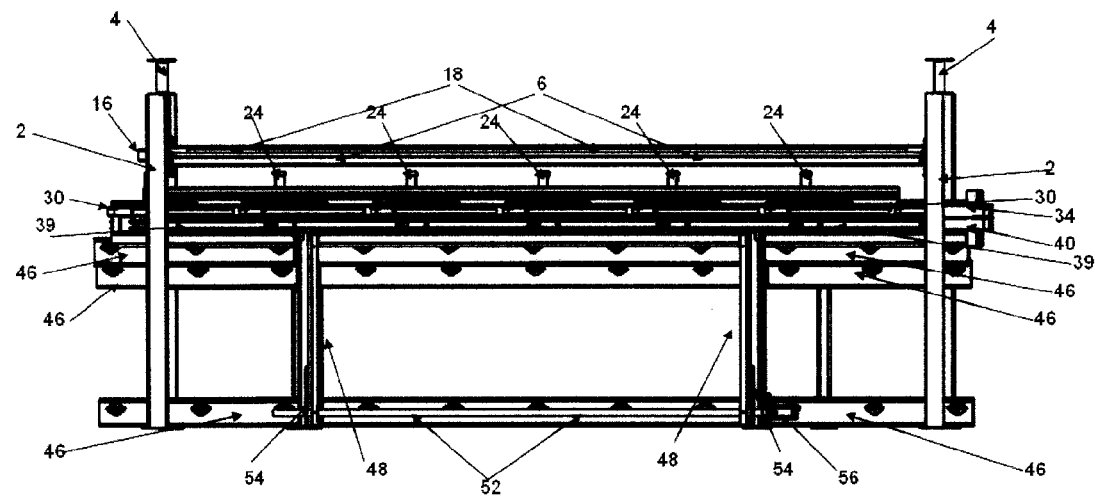
FIGURE 3
FIGURE 4
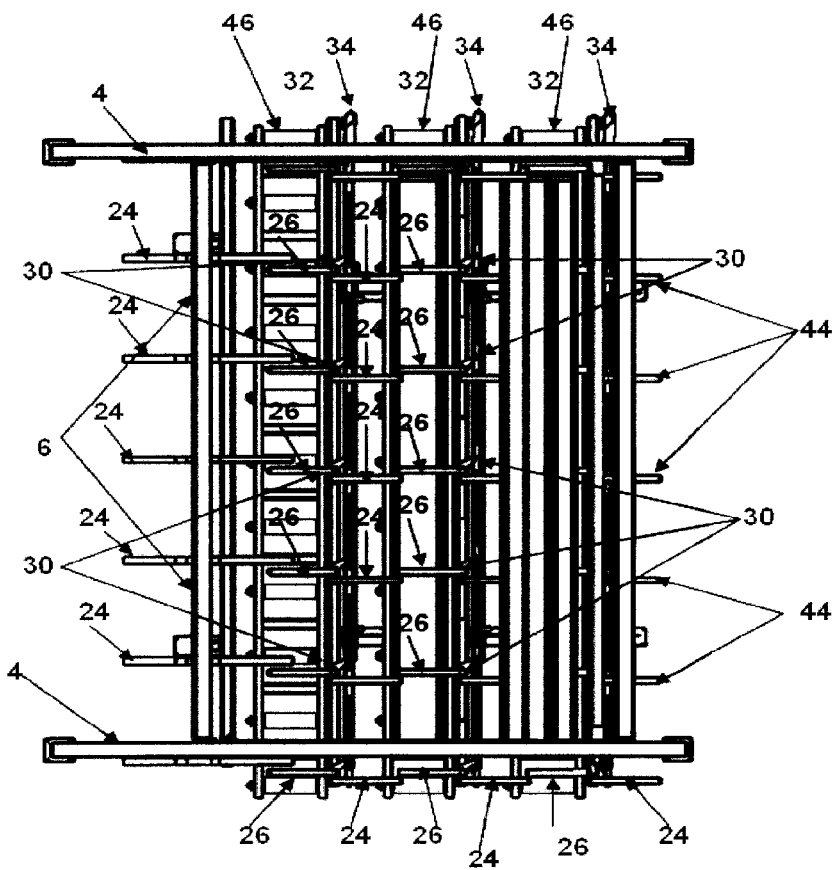

METHOD FOR AUTOMATED STACKING OF WOOD PRODUCTS

CROSS-REFERENCE TO RELATED APPLICATIONS

This application is a continuation of and claims the benefit of priority under 35 U.S.C. §120 from U.S. patent application Ser. No. 11/859,986, filed on Sep. 24, 2007, and titled "Method for Sorting Engineered Wood Products," the contents of which are incorporated herein by reference.

TECHNICAL FIELD

The present disclosure generally to a computer-implemented method for automated stacking of engineered of wood products.

BACKGROUND

Engineered panels are formed from raw materials which are pressed and heated to form a wood or wood-containing product. The raw materials may be, for example, strands, chips, wafers, fiber, flour, particles, or the like. Composite panels, such as oriented strandboard (OSB), flakeboard, waferboard or TimberStrand® laminated lumber, are generally comprised of bonding resin (adhesive), wax and wooden strands. These products are typically manufactured in several major stages, which include stranding, screening, drying, blending, forming, pressing, and finishing.

Once the engineered wood products (EWP) are formed, they are stacked. In an example, veneer stacking systems currently in use transport each veneer sheet to a bin. The veneer product is placed into the bins, and no special handling requirements for the material are required. Once the bin reaches a pre-determined height, it will lower and discharge the 4 foot by 8 foot sheets of veneer product. Because the veneer is uniform in dimension, no special handling devices are required. Also on the market are crane systems that transport the engineered wood products. These systems are cumbersome and slow.

Designers use custom software, such as that offered by Weyerhaeuser, to design a residential home structure using engineered wood products. When the structure is designed and the proper size engineered wood product members are identified, an electronic file is created for each piece of EWP for the structure that identifies the length, special cuts, and labeling. To increase efficiency of cutting, several structures are batched together in another Weyerhaeuser custom software package that optimizes the use of each board of EWP that the special pieces will be cut from. The traditional outfeed systems offered by known saw lines utilize a manual outfeed pull chain. Operators physically select and grasp the newly cut engineered wood products and pull them into a cart. There are many disadvantages with this system, the greatest of which are ergonomic and safety concerns. Thus, a need exists for a stacking system for wood products that is used in conjunction with specific handling requirements.

SUMMARY

The following summary is provided for the benefit of the reader only and is not intended to limit in any way the invention as set forth by the claims. The present disclosure is directed generally towards generally to a computer-implemented method for automated stacking of engineered of wood products.

In some embodiments, the disclosure includes a computer-implemented method for sorting engineered wood products, the method comprising the steps of designing at least two types of engineered wood products via a software application; producing the at least two types of engineered wood products based on the designs utilizing a saw in conjunction with the software application; designating, via the software application, at least two bins to hold the at least two different types of engineered wood products; selecting a first bin for depositing a first type of engineered wood product; selecting a second bin for depositing a second type of engineered wood product; automatically placing the first type of engineered wood product into the first bin; and automatically placing the second type of engineered wood product into the second bin. The at least two types of engineered wood products are at least two of: panels, I-joists, headers and dimensional lumber. Further aspects are directed towards a computer readable storage medium storing computer-executable instructions that, when executed, cause a computing system to perform a method for sorting engineered wood products, the method described above.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows:

FIG. 3 illustrates an end view of the stacking system from FIG. 1 as wood enters the system;

FIG. 4 illustrates a top view of the stacking system from FIG. 1;

DETAILED DESCRIPTION

Figure 1:
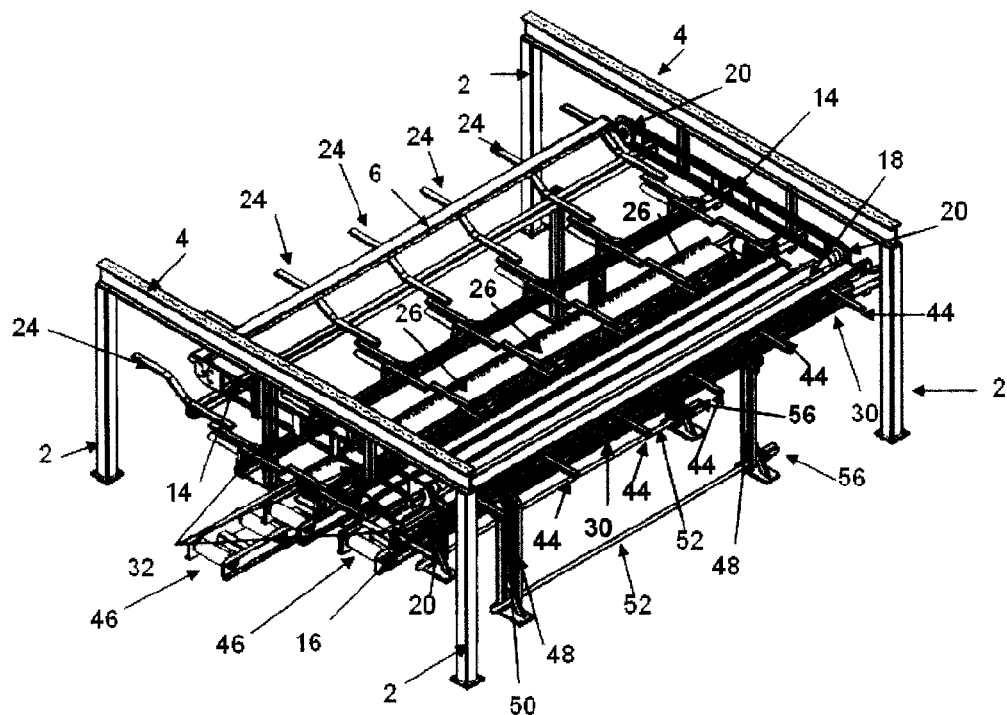
FIG. 1 illustrates an isometric view of a stacking system according to embodiments of the disclosure.
Figure 2:
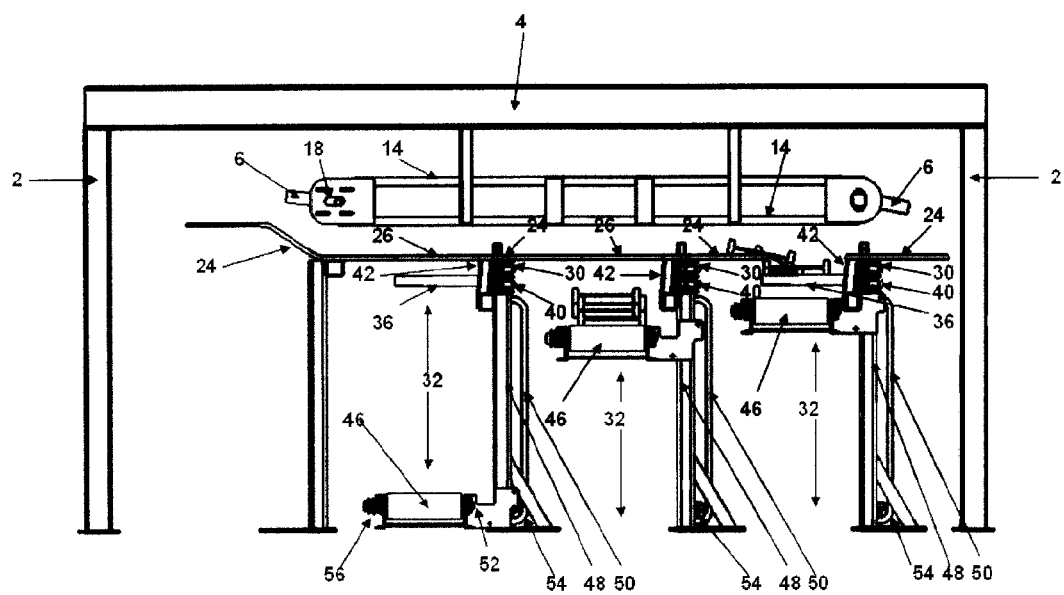
FIG. 2 illustrates a side view of the stacking system from FIG. 1.
Figure 5:
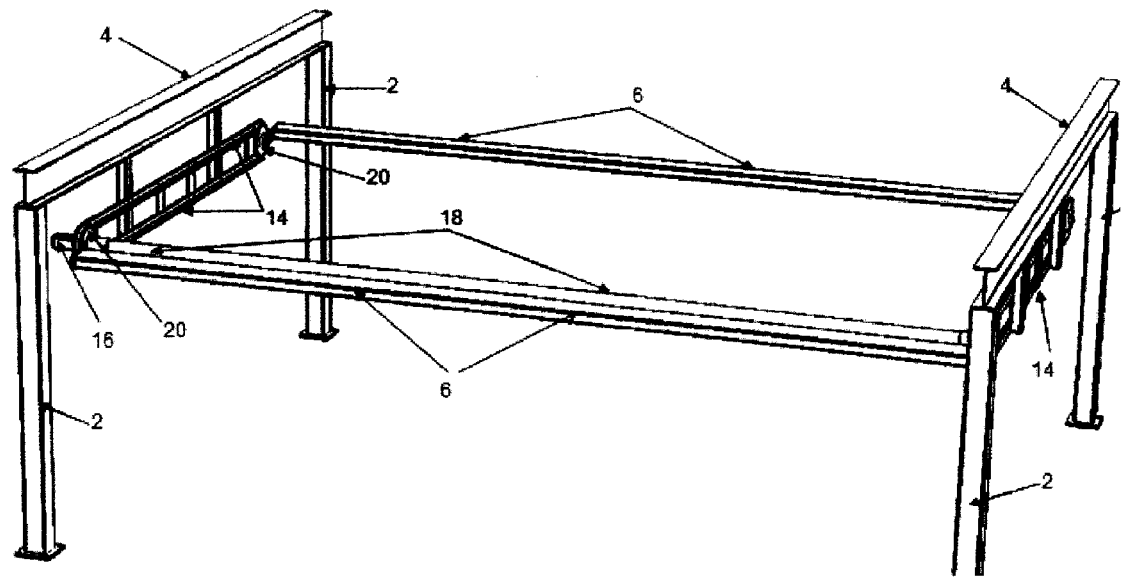
FIG. 5 illustrates a sweep arm conveyor for the stacking system from FIG. 1.
Figure 6:
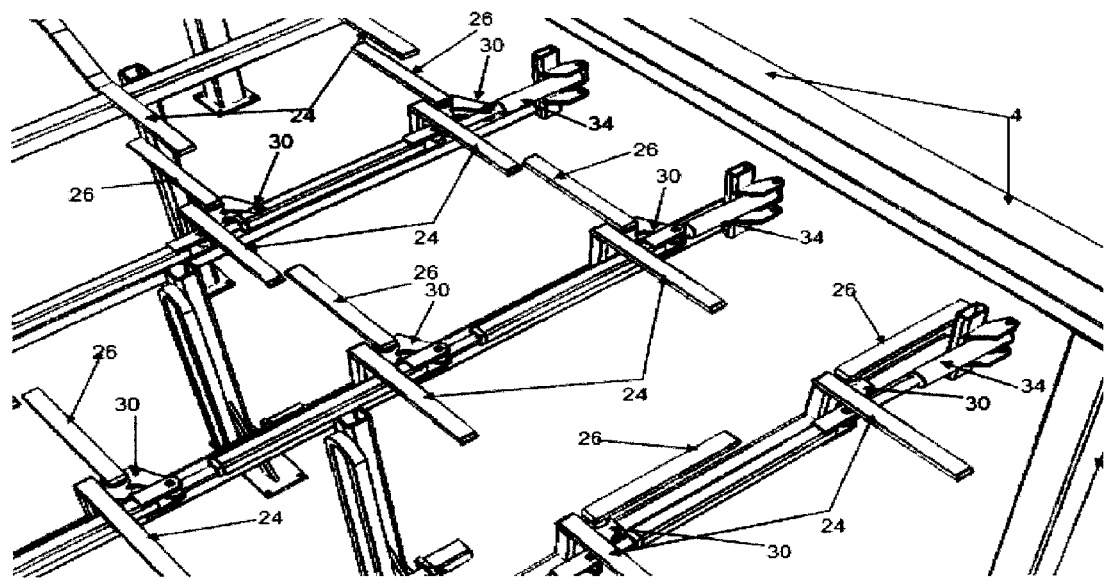
FIG. 6 illustrates bin pivot gates for the stacking system from FIG. 1.

The present disclosure describes a computer-implemented method for automated stacking of engineered of wood products. Certain specific details are set forth in the following description and FIGS. 1-9 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

The present disclosure involves a system for automating a process from design of a structural application to cutting and sorting. The system utilizes, in an embodiment, a saw, such as a Hundegger SC-1 saw to process engineered wood products into exact components. These exact components are selected via, for example, design software for a floor system. One example of this type of software is iLevel Javelin® software offered by Weyerhaeuser Company, in which a designer models an entire house's structural frame, including components such as joists, headers, beams, rimboard or the like. The dimensions and labeling for individual members of the structure are extracted from the model designed by the software and captured. "Captured" refers to a state at which the specific length, cuts (i.e., bevels or angles), and/or labeling defined in the drawing and stored in an electronic file can be, or are in fact, translated to saw file language. In an embodiment, capturing is accomplished by, for example, Stellar® software offered by Weyerhaeuser Company. This software batches and optimizes the products to be cut on the saw and develops sawing control instructions. The instructions are used by the saw to process the parts according to the house structure design.

In an embodiment, a system is provided for sorting engineered wood products. The system has a central processing unit; a sawing device in connection with the central processing unit wherein the sawing device performs a sawing function based on specifications communicated by the central processing unit for creating the engineered wood products wherein the sawing device creates at least two types of engineered wood products; a transport conveyor located downstream from the sawing device; and two or more bins located adjacent to the transport conveyor wherein at least two of the two or more bins are designated for storing different types of engineered wood products wherein each of the bins has a bin pivot gate and further wherein the transport conveyor transports the engineered wood products toward the two or more bins; wherein the central processing unit delivers a first command to move a first bin pivot gate to allow placement of one type of engineered wood product into a first bin and delivers a second command to move a second bin pivot gate to allow placement of a second type of engineered wood product into a second bin.

In an embodiment, the system further comprises software in connection with the central processing unit wherein the engineered wood products are designed within the software. The system may further comprise a nesting device associated with the bin. In an embodiment, the system further comprises a roller conveyor within one of the bins which raises or lowers based on a number of engineered wood products within the bin.

In an embodiment, the system further comprises a tamping device associated with the bin.

In an embodiment, the engineered wood products are at least two of: panels, I-joists, headers and dimensional lumber.

In an embodiment, the engineered wood products are approximately 50 feet in length.

In an embodiment, the transport conveyor is in connected with a roller chain.

In an embodiment, the system further comprises a gripper wagon adjacent the saw wherein the gripper wagon transports the engineered wood products from the sawing device to the transport conveyor.

In an embodiment, a method is provided for sorting engineered wood products. The method comprises the steps of: designing at least two types of engineered wood products via a software application; producing the at least two types of engineered wood products based on the designs utilizing a saw in conjunction with the software application; designating, via the software application, at least two bins to hold the at least two different types of engineered wood products; selecting a first bin for depositing a first type of engineered wood product; selecting a second bin for depositing a second type of engineered wood product; automatically placing the first type of engineered wood product into the first bin; and automatically placing the second type of engineered wood product into the second bin.

In an embodiment, the method has the further step of rotating the engineered wood product when it is placed in the first bin.

In an embodiment, the method has the further step of placing a plurality of the first type of engineered wood products into the first bin to create a stack of first engineered wood products.

In an embodiment, the method has the further step of lowering the stack of first engineered wood products when a quota is reached.

In an embodiment, the method has the further step of detecting a height of the stack within the first bin.

In an embodiment, the method has the further step of discharging the stack from the bin.

In an embodiment, the engineered wood products are at least two of: panels, I-joists, headers and dimensional lumber.

In an embodiment, the method has the further step of aligning the plurality of engineered wood products.

In an embodiment, a method is provided for sorting engineered wood products. The method comprises the steps of: designing at least two types of engineered wood products via a software application wherein the two types of engineered wood products define a first bundle; producing the at least two types of engineered wood products based on the designs utilizing a saw in conjunction with the software application; designating, via the software application, at least two bins to hold the at least two different bundles of engineered wood products; selecting a first bin for depositing the first bundle of engineered wood product; selecting a second bin for depositing a second bundle of engineered wood product; automatically placing the first bundle of engineered wood products into the first bin; and automatically placing the second bundle of engineered wood products into the second bin.

In an embodiment, the method has the further step of detecting a height of the first bundle within the first bin.

In an embodiment, the method has the further step of lowering the first bundle based on its height.

In an embodiment, an entry level output system may produce engineered wood product at approximately a 1000 lineal ft/hr processing rate. A standard system may produce engineered wood product at approximately a 2500 lineal ft/hr processing rate. The high output system may produce engineered wood product at approximately a 3000 lineal ft/hr processing rate. Each level requires an increased amount of automation. The highest level of automation, high output, may use an automated system to sequence and feed the engineered wood products into, for example, the Hundegger Saw which maximizes the output of the saw. As the parts are processed by the saw, they are discharged and sent to an outfeed system that will stack the engineered wood products according to the parameters defined by, for example, a workstation operator. It should be noted that an operator may be required to input the parameters into computers utilized in the system. The parameters may include options, such as which engineered wood products to run/produce; into which bin each piece processed by the saw would be stacked; or the size of the stack.

This automated system of the present invention differs greatly from the traditional outfeed pull chain systems offered by other saw lines. As previously stated, with respect to known saw lines, when utilizing a manual outfeed pull chain, operators physically select and grasp the newly cut engineered wood products and pull them into a cart. A outfeed pull chain is a conveyor system that singulates wood as it is transported. An operator can physically select each board for sorting and manually pull it into a cart/bin. There are many disadvantages with this system, the greatest of which are ergonomic and safety concerns. The system of the present invention may handle multiple lengths and widths of engineered wood products which exit the saw area and stack them in the order that the, for example, Stellar® software specifies. Utilizing simple conveying parts, such as transport chains that are readily available in the market, this system conveys each part to a particular, or designated, bin. Transport chains utilize a motor which drives a gear reducer that will, in turn, drive a sprocket and shaft that has conveyor chain sprockets attached to it. When the shaft is rotated, the conveyor chain is moved. These components are described further below, and illustrated in FIG. 5. Each bin may have a gate or door that, for example, pivots to an open position and allows the engineered wood product component to, in essence, "drop" in. Each bin is equipped with a nesting device that will automatically "nest" a component, such as the TJI-Joist® offered by Weyerhaeuser Company, prior to stacking. Nesting, for example, a TJI-Joist® refers to fitting the flanges of one board inside the flanges of another. For example, one might stack the joists with the flanges resting on top of each other; however, this might require a greater space. If a component such as a TJI-Joist® is not being produced, the automatic "nesting" device is retracted out of the bin. The engineered wood product header material is allowed to be placed directly onto the stack of engineered wood products, such as, Microllam®, Parallam® or Timberstrand®. The height of each stack is controlled by an elevating conveyor as the stack is built. The elevating conveyor may be in connection with the CPU via, for example, through a light sensing device which emits a light beam. When the light beam is broken, the CPU is notified to lower the elevating conveyor until the light beam is once again detected. Such light beam devices are known in the industry. When instructed by the software that the last piece for that bundle or stack of engineered wood products is received, the elevating conveyor will lower to a discharging position and convey the full bundle out of the bin. In an embodiment, each bin is capable of handling lengths up to 50' and widths of 9.5" to 18". It should be understood, however, that any dimensions may be utilized with respect to bin size and/or dimensions of EWP which can be contemplated by one of ordinary skill in the art.

EWP Automatic Stacking Device

The design of the stacking system utilizes five modules. The configuration of the stacking system is referenced in FIGS. 1-8. The stacking system is made of an external support system which may be constructed from, for example, structural steel. Four corner legs 2 may support long structural steel beams 4 from which the transport conveyor, i.e., sweep arm conveyor 6 is supported. Also mounted on top of the long structural steel beams is the Programmable Logic Controller (PLC) that receives input from sensing devices and controls the machine. Such Programmable Logic Controllers are generally known to those skilled in the art.

The transport conveyor, or sweep arm conveyor 6, is comprised of a long sweep arm that is connected to a roller chain 14 on each end. A hydraulic motor 16 drives a shaft 18 that contains, for example, two sprockets 20 that move the sweep arm 6. The PLC will activate or deactivate the hydraulic motor 16 based on signals from a sensing device mounted to the transport steel runners 24.

The transport steel runners 24 is made up of, for example, 2 inch wide steel that may have an outer plastic surface to reduce friction. The transport steel runners 24 may be, for example, two feet long and may be in line with a retractable bin pivot gate 26. The gate 26 may have a length in a range from 26 inches to 48 inches. This series of transport steel runners 24 and bin pivot gates 26 may repeat for whatever size stacking system is desired.

The bin pivot gate actuating arm 30 is part of a lever arm system that may rotate the bin pivot gate 26 90 degrees to open the bin 32. The bin pivot gate actuating arm 30 is activated by, for example, a hydraulic cylinder 34 that is controlled by the PLC.

Figure 7:
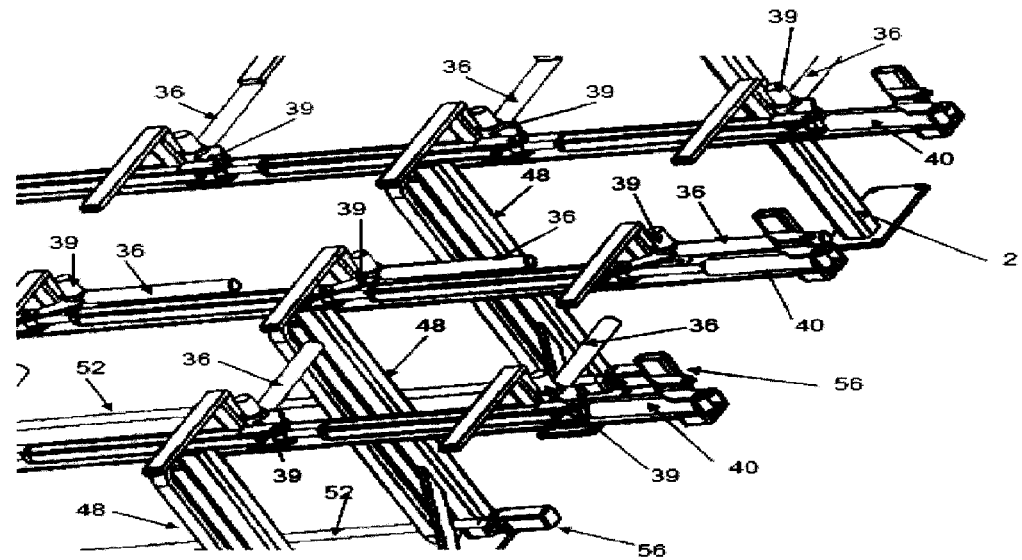
FIG. 7 illustrates a nesting device for the stacking system of FIG. 1.
Figure 8:
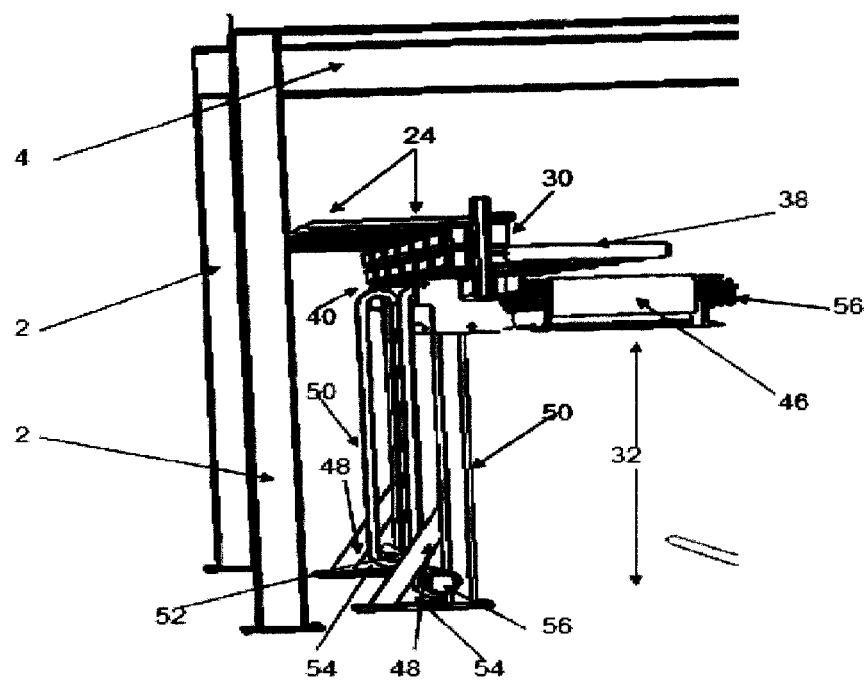
FIG. 8 illustrates an elevating roller conveyor for the stacking system of FIG. 1.

Inside each bin may be a nesting device 36 which, in one embodiment, may be in the form of a tube having a width in a range from 18 inches to 24 inches and may be constructed from, for example, steel or like material. The nesting device 36 may hold engineered wood products, such as, for example, the TJI-Joists® when they enter the bin 32. The nesting device 36 will rotate 90 degrees to allow the TJI-Joists® to fall onto the elevating roller conveyor 46. The nesting device 36 is attached to a nesting device actuating arm 39 as seen in FIG. 7. A hydraulic cylinder 40 moves the nesting device actuating arm 39 which, in turn, rotates the nesting device 36 90 degrees.

Inside each bin 32 may also be a tamping device 42 which, in one embodiment may be in the form of a square plate having dimensions in a range from 4 inches to 6 inches. The plate 42 may be mounted on an air cylinder 44. When the cylinder 44 extends, the plate 42 moves in an upstream direction until restricted by the EWP. The cylinder 44 then retracts.

Each bin may also have an elevating roller conveyor 46 having, for example, 4 inch steel rollers mounted every 40 inches. The roller conveyor 46 may be driven by a hydraulic motor 56. The elevating roller conveyor 46 is cantilever mounted to support legs 48. At each leg may be a roller chain 50 that is connected to the elevating roller conveyor 46. At the base of the support legs 48 may be a shaft 52 with sprockets 54. The shaft 52 is connected to a reversible hydraulic motor 56 which raises and lowers the elevating roller conveyor 46.

Sequence of Operation

Figure 9:
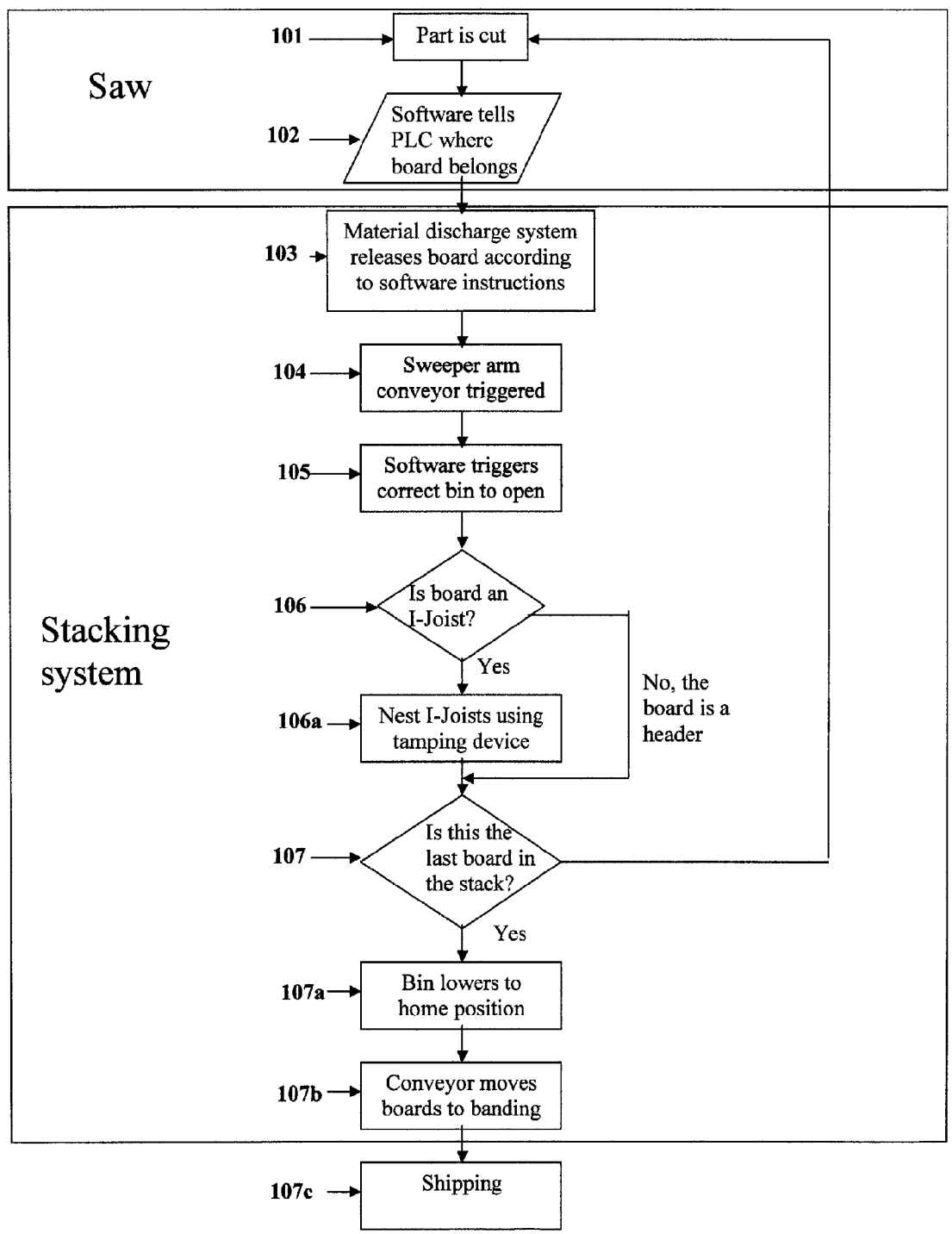
FIG. 9 illustrates a flow chart for steps associated with operating stacking systems according to embodiments of the disclosure.

Referring now to FIG. 9, as the parts are processed by the sawing system, as shown at step 101, they are discharged. The software optimizes not only for reduced waste and efficient use of the storage length wood, but also for proper stacking by order.

The stacking system may receive the cut pieces from the saw via a transporting device, such as the gripper wagon. The gripper wagon will position each piece as it is to be stacked, as shown at step 102. The stacking system will receive the bin order signal from the software, as shown at step 103, as each piece is processed and positioned by the gripper wagon. As the piece is released by the gripper wagon, it will enter the stack infeed area 24. The stacking system senses that the piece that was most recently cut is in position and ready to be transported to the bin. The stacking system will activate and transport the piece to the appropriate bin via the sweep arm transport conveyor 6, as shown at step 104 in FIG. 9. More specifically, the sweep arm conveyor 6 is driven by a motor/chain conveyor system 16, 18 at a rate of, for example, 750 fpm. The sweep arm conveyor 6 is connected to the sweep arm roller chain 14 and hangs sufficiently low to make contact with a board that is, for example, 1.5 inches in thickness or greater. The sweep arm conveyor 6 may then drag the board across the stacker transport steel runners 24 until it gets to the designated bin 32.

The bin pivot gate arms 26 for the bin 32 open to receive the piece, as shown at step 105. The piece will fall into the bin onto the nesting device 36 if, for example, the specific piece, such as the TJI-Joist® is being processed, or onto the elevating roller conveyor 46 if engineered wood product header material, such as Microllam®, Parallam®, or Timberstrand® is being processed, as shown at decision 106.

If, for example, TJI-Joist® material is being run/produced, the nesting step will be performed, as shown at step 106*a*. This is accomplished by tamping the first TJI-Joist® against a fence, upstream in a machine direction. Tamping is an operation that ensures all boards in the stack align to a straight line. In this manner, a rectangle-shaped stack may be created and/or maintained. This is accomplished by the tamping device 42, which in one embodiment is in the form of a round disk mounted on a cylinder 44 that will push the boards against a straight edge. When the second TJI-Joist® enters the bin 32, it will "nest" into the flange of the first TJI-Joist®. When this is complete, the nesting device 36 will retract via the nesting device actuating arm 39 and drop the two nested TJI-Joists onto the elevating roller conveyor 46 that will stack the TJI-Joists® in a nested order.

If engineered wood product header material is being stacked, the nesting device 36 will remain retracted and allow the header material to fall directly onto the elevating roller conveyor 46. As the elevating roller conveyor 46 fills, it will index down. To clarify, as stated above, as the stack is being made within the bin 32, a light sensor is broken, indicating to the CPU to move the elevating roller conveyor 46 down (indexing) to allow the next board to fall into the bin 32. The tamping device 42 will square the engineered wood product headers as they are stacked. The software may already be aware of how many pieces are assigned to each bin 32. As the last piece enters the bin 32, the stacker PLC will be instructed of this, as shown at decision 107. The PLC will then instruct that bin 32 to discharge. The elevating roller conveyor 46 will lower to a "home" position, as shown at step 107*a*. When the elevating roller conveyor 46 lowers to its' home position, a hydraulic drive motor 56 will power the roller conveyor 46 and will power the stack of wood out of the bin for the banding process, as shown at step 107*b*. The grouped products may then be shipped, as shown at step 107*c*.

Those skilled in the art will appreciate that the system/method described herein may be implemented on any computing system or device. Suitable computing systems or devices include personal computers, server computers, multiprocessor systems, microprocessor-based systems, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed as desired in various embodiments.

From the foregoing, it will be appreciated that the specific embodiments of the disclosure have been described herein for purposes of illustration, but that various modifications may be made without deviating from the disclosure. Aspects of the disclosure described in the context of particular embodiments may be combined or eliminated in other embodiments. Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

I claim:

1. A computer-readable storage medium storing computer-executable instructions that, when executed, cause a computing system to perform a method for sorting engineered wood products, the method comprising the steps of:
    designing at least two types of engineered wood products via a software application;
    producing the at least two types of engineered wood products based on the designs utilizing a saw in conjunction with the software application;
    designating, via the software application, at least two bins to hold the at least two different types of engineered wood products;
    selecting a first bin for depositing a first type of engineered wood product;
    selecting a second bin for depositing a second type of engineered wood product;
    automatically placing the first type of engineered wood product into the first bin; and
    automatically placing the second type of engineered wood product into the second bin;
    detecting whether the first type of engineered wood product or the second type of engineered wood product is an I-joist;
    nesting the first type of wood product in the first bin if the first type of wood product is an I-joist;
    wherein the at least two types of engineered wood products are at least two of: panels, I-joists, headers and dimensional lumber.

2. The computer-readable storage medium of claim 1 wherein the method further comprises the steps of:
    rotating the first type of engineered wood product when it is placed in the first bin; and
    rotating the second type of engineered wood product when it is placed in the second bin.

3. The computer-readable storage medium of claim 1 wherein the method further comprises the steps of:
    creating a first stack of the first type of engineered wood products in the first bin; and
    creating a second stack of the second type of engineered wood products in the second bin.

4. The computer-readable storage medium of claim 3 wherein the method further comprises the steps of:
    lowering the first stack of first engineered wood products when a first quota is reached; and
    lowering the second stack of first engineered wood products when a second quota is reached.

5. The computer-readable storage medium of claim 3 wherein the method further comprises the steps of:
    detecting a first height of the first stack within the first bin; and
    detecting a second height of the second stack within the second bin.

6. The computer-readable storage medium of claim 3 wherein the method further comprises the step of:
    discharging the first stack from the first bin; and discharging the second stack from the second bin.

7. The computer-readable storage medium of claim 6 wherein the method further comprises the steps of:
aligning the first type of wood products; and
aligning the second type of wood products.

8. The computer-readable storage medium of claim 1 wherein the method further comprises the steps of:
selecting a third bin for depositing a third type of engineered wood product; and
automatically placing the third type of engineered wood product into the third bin.

9. The computer-readable storage medium of claim 1 wherein the method further comprises the steps of:
selecting a fourth bin for depositing a fourth type of engineered wood product; and
automatically placing the fourth type of engineered wood product into the fourth bin.

* * * * *